United States Patent
Goedeke et al.

(12) 
(10) Patent No.: US 7,799,712 B2
(45) Date of Patent: Sep. 21, 2010

(54) LOW-MELTING LEAD-FREE SOLDER GLASS AND USES THEREOF

(75) Inventors: Dieter Goedeke, Landshut (DE); Peter Brix, Mainz (DE)

(73) Assignee: Schott AG, Mainz (DE)

( * ) Notice: Subject to any disclaimer, the term of this patent is extended or adjusted under 35 U.S.C. 154(b) by 209 days.

(21) Appl. No.: 12/128,847

(22) Filed: May 29, 2008

(65) Prior Publication Data

US 2008/0300126 A1 Dec. 4, 2008

(30) Foreign Application Priority Data

May 30, 2007 (DE) .................. 10 2007 025 465

(51) Int. Cl.
C03C 3/066 (2006.01)
C03C 8/24 (2006.01)

(52) U.S. Cl. .................. 501/15; 501/17; 501/79

(58) Field of Classification Search .................. 501/15, 501/17, 79
See application file for complete search history.

(56) References Cited

U.S. PATENT DOCUMENTS 5,326,591 A 7/1994 Roberts 6,778,355 B2 * 8/2004 Hasegawa et al. ...... 360/119.05
7,267,713 B2 * 9/2007 Adachi ........................ 106/13
7,291,573 B2 * 11/2007 Ide .............................. 501/50
7,407,902 B2 * 8/2008 Hasegawa et al. ............. 501/15

FOREIGN PATENT DOCUMENTS

| JP | 9-268026 | | 10/1997 |
| JP | 2007031258 | * | 2/2007 |
| JP | 2007246355 | * | 9/2007 |

OTHER PUBLICATIONS

Directive 2002/95/EC of the Eiropean Parliament and of the Council on the Restriction of the Use of Certain Hazadous Substances in Electrical and Electronic Equipment, Brussels, Jan. 2003 (in English).

* cited by examiner

*Primary Examiner*—Karl E Group
(74) *Attorney, Agent, or Firm*—Michael J. Striker

(57) ABSTRACT

The low melting solder glass contains, in wt. % on an oxide basis, >1-2, $SiO_2$; 5-10, $B_2O_3$; 4.5-12, ZnO; 79-88, $Bi_2O_3$; 0.0, $CeO_2$; and 0.6-2, $Al_2O_3$, and a weight ratio of $SiO_2$ to $Al_2O_3$ of <2. The solder glass preferably contains from 80.5 to 85 wt. % of $Bi_2O_3$ and is free of lead. This solder glass has a linear thermal expansion coefficient $\alpha_{(20\text{-}300)}$ of <11.5× $10^{-6}$/K and a transformation temperature Tg of <380° C. A solder glass preparation for connecting or sealing a glass part with a metal part contains the low melting solder glass and up to 20 wt. % of β-eucryptite, cordierite, mullite, willemite or zircon.

15 Claims, No Drawings

LOW-MELTING LEAD-FREE SOLDER GLASS AND USES THEREOF

CROSS-REFERENCE

The invention described and claimed herein below is also described and claimed in German Patent Application DE 10 2007 025 465.4, filed on May 30, 2007, which provides the basis for a claim of priority for the invention described and claimed herein below under 35 U.S.C. 119 (a) to (d).

BACKGROUND OF THE INVENTION

The invention relates to low-melting lead-free solder glass.

Solder glass for making a glass-metal connection for connecting two glass parts with each other, for sealing, has been known for many years.

In the past the desired low melting temperatures and good processing properties were obtained by including large amounts of lead oxide in solder glass. Currently lead-free solder glasses are increasingly being developed in which lead oxide is replaced by bismuth oxide because of the toxicity of lead and because of legal requirements, e.g. the ROHS guidelines ("Limitations on the Use of Certain Dangerous Materials in Electrical and Electronic Units", EG Guidelines 2002/95/EG of Jan. 27, 2003).

U.S. Pat. No. 5,326,591 describes a glass with a composition comprising (in wt. % on an oxide basis) 0-9, $SiO_2$; 10-33, $B_2O_3$; 10-32, ZnO and 35-77, $Bi_2O$. This solder glass has a high melting temperature of about 550° C.

JP 92 68 026 A describes a glass with a composition comprising (in wt. % on an oxide basis) 0-8, $SiO_2$; 5-35, $B_2O_3$; 0-9, ZnO; 36-80, $Bi_2O_3$; 5-40, BaO+SrO. However because of the high alkaline earth metal oxide content this glass has a tendency to crystallize.

U.S. Pat. No. 6,778,355 B2 discloses a solder glass for joining two halves of a magnetic head, which has a composition comprising (in wt. % on an oxide basis) 0.5-14, $SiO_2$; 3-15, $B_2O_3$, 4-22, ZnO; 55-90, $Bi_2O_3$, 0-4, $Al_2O_3$; 0-5, alkali metal oxide and 0-15 alkaline earth metal oxide, in which a weight ratio of $ZnO/B_2O_3$ is 0.8 to 2 and a weight ratio of $SiO_2/Al_2O_3$ is not less than 2. This glass has the disadvantage that it contains a large portion of alkali metal and/or alkaline earth metal oxides at the desired low processing temperatures of 455° C. to 550° C., so that the glass melt produced during glass production is very reactive, foamy and corrosive, which leads to high production costs due to its reaction with conventional platinum melt vessels.

SUMMARY OF THE INVENTION

It is an object of the present invention to provide a low-melting solder glass, which may be processed at soldering temperatures of $\leq 600°$ C., which has a thermal expansion coefficient between $6 \times 10^{-6}$/K to $11 \times 10^{-6}$/K, which may be easily melted, and which does not crystallize when inert ceramic filling materials are added during the soldering process (for the purpose of modifying the thermal expansion coefficient).

These objects and others, which will be made more apparent herein after, are attained by a solder glass with a composition comprising, in wt. % on an oxide basis:

| | |
|---|---|
| $SiO_2$ | >1-2 |
| $B_2O_3$ | 5-10 |
| ZnO | 4.5-12 |
| $Bi_2O_3$ | 79-88 |
| $Al_2O_3$ | 0.6-2 |
| $SiO_2/Al_2O_3$ | <2; | and with a linear thermal expansion coefficient $\alpha_{(20\text{-}300)}$ of under $11.5 \times 10^{-6}$/K and a transformation temperature Tg of under 380° C.

The $SiO_2$ content also serves to obtain a stable glass.

If the $SiO_2$ content of the glass is less than 1 wt. % a devitrification occurs (already even during casting). If the $SiO_2$ content is above 2 wt. %, the soldering temperature increases. Embodiments of the soldering glass containing from 1.1 to 1.5 wt. % $SiO_2$ are particularly preferred.

The $B_2O_3$ content should be between 5 wt. % and 10 wt. %. The $B_2O_3$ content should not fall below the critical 5 wt. % level, since crystallization of the glass greatly increases, which leads to an undesirable increase in the soldering temperature. When the upper limit of 10 wt. % is exceeded, the desired low soldering temperature cannot be attained. However it is preferable when no more than 8 wt. % of $B_2O_3$ is present in the solder glass.

The ZnO content should be between 4.5 wt. % and 12 wt. %. ZnO acts to decrease the processing temperature of the glass. A higher ZnO content above 12 wt. % leads to an increased tendency to crystallize because of formation of Zinc spinels and ZnO crystals. Preferably the content of ZnO should be between 10 wt. % and 12 wt. %. As already mentioned, $B_2O_3$, among other things, inhibits crystallization. With the higher amounts of ZnO the use of greater $B_2O_3$ amounts within the scope of the claimed composition is recommended. Thus a lower limit for the $B_2O_3$ content is preferably 5.5 wt. %, especially 6 wt. %.

When $Bi_2O_3$ is contained in the glass in amounts of 79 wt. % to 88 wt. %, it replaces the PbO of the prior art solder glass and acts as glass former. The required low soldering temperature cannot be attained with amounts of $Bi_2O_3$ under 79 wt. %. Above 88 wt. % the crystallization tendency increases. A $Bi_2O_3$ content between 80.5 wt. % and 85 wt. % is especially preferred, because a low soldering temperature occurs with the $Bi_2O_3$ content within this range with a simultaneously higher crystallization stability.

$Al_2O_3$ has a stabilizing effect and increases the chemical resistance. It is contained in amounts of from 0.6 to 2 wt. % in the glass. Preferably the $Al_2O_3$ is contained in the solder glass in an amount of from 0.7 to 1 wt. %.

A weight ratio of $SiO_2/Al_2O_3$ of below 2 is beneficial and advantageous in the solder glass in order to obtain a glass that is stable and resists crystallization. The weight ratio of $SiO_2/Al_2O_3$ is preferably between 1 and 1.8, preferably between 1.45 and 1.6.

The addition of alkali metal and alkaline earth metal oxides produces a very reactive and corrosive melt in practice, which makes the conventional production of the solder glass in platinum vessels impossible, or at least leads to an extremely short service life of the platinum vessels. Only small amounts of $Na_2O$ can be tolerated in the glass system without increasing the danger of devitrification of the glass. Generally an alkali metal and/or alkaline earth metal oxide content leads to an undesirably high thermal expansion coefficient. Preferably addition of alkali metal oxides and alkaline earth metal oxides in the glass system is to be avoided and the solder glass is preferably melted free of alkali. The term "free of alkali" or "alkali-free" means that the glass only contains unavoidable traces of alkali metal oxides and/or alkaline earth metal oxides, which are incorporated by the raw materials or crucible materials. The content of these unavoidable impurities is generally in a range below 0.01 wt. % in the finished glass.

The glass can contain conventional refining agents in conventional amounts. Thus it contains up to 2 wt. % $As_2O_3$, $Sb_2O_3$, $SnO_2$, $CeO_2$, $MnO_2$, $Fe_2O_3$, $Cl^-$ (e.g. as $ZnCl_2$) and/or sulfates (e.g. as $ZnSO_4$). However $As_2O_3$ should be avoided as much as possible because of environmental considerations.

Since the glass of the present invention is used for making solder in the form of a powder or granulate, the production of a bubble-free melt plays a subordinate roll here. Redox additives such as $As_2O_3$, $Sb_2O_3$, $SnO_2$, $CeO_2$, $MnO_2$ or $Fe_2O_3$ advantageously stabilize bismuth in its trivalent oxidation state, $Bi^{+3}$, during the melt formation. Thus troublesome metal bismuth precipitation is avoided. The stabilization of $Bi^{+3}$ can also be achieved or assisted by conducting the melting process under oxidizing conditions, e.g. by conducting $O_2$ into the melt. The supplying of oxygen by the above-mentioned redox additives during the melting and/or the conduction of oxygen also prevents reduction of bismuth oxide to the elemental metal. The addition of these refining agents has a positive effect on the further processing to form the glass-metal bond. The redox additives cause the formation of an oxide layer, which has good adherence on the glass and also the metal, on the metal (or the alloy).

Each of the solder glasses according to the invention is ground up in a known manner prior to its used and after its manufacture and is processed according to the desired sealing and/or soldering process. Usually it is used as a powder or a paste, e.g. in an alcohol/water mixture in order to simplify application to the soldering location. The paste is applied with a screen printing medium in case the solder is applied by means of screen printing to the soldering location. The glass powder can be pre-pressed or pre-sintered to form a solder body, e.g. a ring, which is especially suitable for glazing of lenses or disks into hollow cylinders (optocaps) or also for making solder/plastic bodies. For example, foils of arbitrary shape can be punched out or cut out for complicated soldering applications.

The solder glass powder can be mixed with a filling material in a known way in order to adjust the thermal expansion coefficient of the solder material to the parts to be soldered. Conventional filling materials include e.g. β-eucryptite, cordierite, mullite, willemite and zircon. Both the glass and, if necessary, the filling material are ground to a grain size that is appropriate for the particular application. Typical grain sizes are in a range for $d_{50}$ of from 3 μm to 10 μm.

The advantages of the new solder glass of the present invention include a lower processing temperature (soldering temperature), a small or absent tendency to crystallize during soldering, especially in the presence of additives usually provided that promote crystallization, and a good adherence both to glass and also metal, so that the new solder glass is especially suitable for glass-metal bonding. In addition, optical coatings on glass to be soldered and galvanic coatings (e.g. nickel and gold) on the metal parts to be soldered are protected from a heat load by the low soldering temperature when the low melting solder glass preparations according to the invention are used.

EXAMPLE

Glasses of the above-stated composition (in wt. %) were prepared by melting batches of conventional raw materials in an inductively heated platinum crucible at 900° C. The melting time was from three to four hours. During the melting process oxidizing conditions were maintained in the melt by conduction of oxygen into the melt, in order to avoid reaction of bismuth oxide.

Subsequently the melted glass was cast into blocks, which were cooled to a temperature of 400° C. in a stress-free manner with a cooling speed of 20 K/h or were worked or processed to glass powder or to ribbons suitable for further processing, when the melt was poured through two water-cooled steel rollers rotating in rotation directions that were opposite to each other.

The linear thermal expansion coefficients $\alpha_{(20-300)}$ in ppm/K ($10^{-6}$/K), the densities in g/cm$^3$, and the glass transformation temperatures Tg in ° C. of the glasses that were produced were measured. The moisture or water resistance ("$H_2O$") of glass cubes with an edge length of 1 cm in contact with cooking water was measured in mg/cm$^2$.

The sinter onset point, the hemisphere formation point and the fusion or flow point were measured. For that purpose a cylindrical sample of glass powder of about 20 mm$^3$ in size was prepared and heated continuously at a speed of 10 K/min on an alumina support in a heated microscope. The sinter onset point, the hemispherical point and the flow point were measured with an automatic imaging and analyzing system. The important processing temperature for practical applications corresponds approximately to the hemisphere formation point.

Furthermore the crystallization tendency or sensitivity was determined. For this purpose a DSC measurement (differential scanning calorimeter) was performed and the sintering curve of the samples was drawn continuously with an image analyzing system.

The composition and properties of the exemplary glasses of the invention are tabulated in the accompanying table 1.

Example 5 however is a comparative example, in which the glass has a reduced $B_2O_3$ content that is not of the prevent invention. Example 1 shows that the glasses of the invention with reduced ZnO amount and a content of $Na_2O$ that is small still have a tolerable crystallization tendency.

TABLE I

SOLDER GLASS COMPOSITIONS AND PROPERTIES THEREOF

| | EXAMPLE: | | | | |
|---|---|---|---|---|---|
| | 1 | 2 | 3 | 4 | 5 Comparative |
| $SiO_2$ | 1.2 | 1.2 | 1.2 | 1.2 | 1.2 |
| $B_2O_3$ | 5.1 | 6.2 | 6.2 | 6.2 | 6.2 |
| ZnO | 5.5 | 11.2 | 11.1 | 11.1 | 11.1 |
| $Bi_2O_3$ | 86.2 | 80.7 | 79.7 | 79.7 | 82.7 |
| $Al_2O_3$ | 0.8 | 0.8 | 0.8 | 0.8 | 0.8 |
| $Na_2O$ | 1.2 | | | | |
| $CeO_2$ | | | 0.5 | | |
| $Sb_2O_3$ | | | | 0.5 | |
| $MnO_2$ | | | | 1.0 | |
| $SiO_2/Al_2O_3$ | 1.50 | 1.50 | 1.50 | 1.50 | 1.50 |
| $\alpha_{(20-300)}10^{-6}$/K | 11.1 | 10.1 | 10.0 | 10.0 | 10.5 |
| Tg, ° C. | 356 | 365 | 370 | 372 | 353 |
| Density, g/cm$^3$ | 6.911 | 7.131 | 7.118 | 7.081 | 7.303 |
| Crystallization | Slight | No | No | No | Yes |
| $H_2O$ | 0.08 | 0.08 | n.d.* | n.d.* | n.d.* |
| Sinter onset point, ° C. | 367 | 374 | 390 | 390 | 366 |
| Hemiphere Formation Point, ° C. | 606 | 495 | 520 | 390 | 480 |
| Fusion point, ° C. | 650 | 574 | 599 | 607 | >700 | n.d.* = not determined

While the invention has been illustrated and described as embodied in a low-melting lead-free solder glass and its uses, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A solder glass with a composition, in wt. % on an oxide basis, comprising:

| | |
|---|---|
| $SiO_2$ | >1-2 |
| $B_2O_3$ | 5-10 |
| $ZnO$ | 4.5-12 |
| $Bi_2O_3$ | 79-88 |
| $Al_2O_3$ | 0.6-2 |
| $CeO_2$ | 0.0; | and with a linear thermal expansion coefficient ($\alpha_{(20\text{-}300)}$) of $<11.5 \times 10^{-6}$/K and a transformation temperature (Tg) of <380° C.; and wherein a weight ratio of said $SiO_2$ to said $Al_2O_3$ is less than 2.

2. The solder glass as defined in claim 1, containing up to 2 wt. % of $Na_2O$.

3. The solder glass as defined in claim 1, containing from 1.1 to 1.5 wt. % of said $SiO_2$.

4. The solder glass as defined in claim 1, containing from 5.5 to 8 wt. % of $B_2O_3$.

5. The solder glass as defined in claim 1, containing from 10 to 12 wt. % of said ZnO.

6. The solder glass as defined in claim 1, containing from 80.5 to 85 wt. % of $Bi_2O_3$.

7. The solder glass as defined in claim 1, containing from 0.7 to 1 wt. % of said $Al_2O_3$.

8. The solder glass as defined in claim 1, wherein said ratio of said $SiO_2$ to said $Al_2O_3$ is from 1 to 1.8.

9. The solder glass as defined in claim 8, wherein said ratio is from 1.45 to 1.6.

10. The solder glass as defined in claim 1, which is free of any alkali metal oxide and free of any alkaline earth metal oxide.

11. The solder glass as defined in claim 1, which is free of lead.

12. A solder glass preparation comprising a solder glass and a filling material for modification of a thermal expansion coefficient, wherein said filling material is present in the preparation in an amount of up to 20 wt. %, based on a total amount of said filling material and said solder glass;

wherein said solder glass has a composition, in wt. % on an oxide basis, comprising:

| | |
|---|---|
| $SiO_2$ | >1-2 |
| $B_2O_3$ | 5-10 |
| $ZnO$ | 4.5-12 |
| $Bi_2O_3$ | 79-88 |
| $Al_2O_3$ | 0.6-2 |
| $CeO_2$ | 0.0; | a linear thermal expansion coefficient ($\alpha_{(20\text{-}300)}$) of $<11.5 \times 10^{-6}$/K; and a transformation temperature (Tg) of <380° C.; and wherein a weight ratio of said $SiO_2$ to said $Al_2O_3$ is less than 2.

13. The solder glass preparation as defined in claim 12, wherein said filling material comprises at least one substance selected from the group consisting of β-eucryptite, cordierite, mullite, willemite and zircon.

14. The solder glass preparation as defined in claim 12, wherein said solder glass is free of lead, free of any alkali metal oxide, and free of any alkaline earth metal oxide.

15. The solder glass preparation as defined in claim 12, wherein said solder glass contains from 80.5 to 85 wt. % of said $Bi_2O_3$.

* * * * *